United States Patent [19]

Santachiara

[11] Patent Number: 5,611,242

[45] Date of Patent: Mar. 18, 1997

[54] CLUTCH UNIT ARRANGEMENT IN A TRACTOR POWER TAKE-OFF

[75] Inventor: Dante Santachiara, Campagnola Emilia, Italy

[73] Assignee: Landini S.p.A., Reggio Emilia, Italy

[21] Appl. No.: 329,829

[22] Filed: Oct. 27, 1994

[30] Foreign Application Priority Data

Nov. 2, 1993 [IT] Italy .................. RE930078 U

[51] Int. Cl.⁶ ............................................ F16H 1/00
[52] U.S. Cl. ............................................ 74/15.63
[58] Field of Search ............................... 74/15.63

[56] References Cited

U.S. PATENT DOCUMENTS

| | | | |
|---|---|---|---|
| 2,140,687 | 12/1938 | Brown . | |
| 2,168,033 | 8/1939 | Johnston et al. | 74/15.63 |
| 2,661,634 | 12/1953 | Bechman et al. | 74/15.63 |
| 2,743,615 | 5/1956 | Keese . | |
| 3,111,852 | 11/1963 | May et al. | 74/15.63 |
| 3,548,681 | 12/1970 | Crooks | 74/15.63 |
| 4,773,277 | 9/1988 | Cook et al. | 74/15.63 |
| 4,811,614 | 3/1989 | Lasoen | 74/15.63 |
| 5,001,941 | 3/1991 | Nemoto | 74/15.63 |

FOREIGN PATENT DOCUMENTS

| | | |
|---|---|---|
| 634816 | 1/1962 | Canada .................. 74/15.63 |
| 0357580 | 3/1990 | European Pat. Off. . |
| 0511480 | 11/1992 | European Pat. Off. . |
| 936183 | 12/1955 | Germany . |
| 8301928 | 6/1983 | WIPO . |

*Primary Examiner*—Vinh T. Luong
*Assistant Examiner*—David Fenstermacher
*Attorney, Agent, or Firm*—Birch, Stewart, Kolasch & Birch, LLP

[57] ABSTRACT

A clutch unit for the main power take-off of agricultural tractors, having its input shaft (5) aligned with the engine shaft to which it is connected and its coaxial output shaft (6) driving the power take-off (3) via a change-speed gear unit, is positioned behind the rear wheel axle, with the drive hub (61) positioned to the rear of the power take-off change-speed gear unit, so as to be accessible from the outside by removing a cover (13).

10 Claims, 2 Drawing Sheets

CLUTCH UNIT ARRANGEMENT IN A TRACTOR POWER TAKE-OFF

The present invention generally concerns tractors and other similar vehicles, and more particularly relates to the clutch unit associated with the power take-off of said tractors.

The invention specifically relates to a particular arrangement of said clutch unit.

BACKGROUND OF THE INVENTION

Tractors in general, to which the invention particularly but not exclusively applies, are known to be provided at their rear with a power take-off, hereinafter called the main power take-off for convenience, which is used for various applications, for example for operating agricultural equipment.

Modern tractors are also known to be provided with a further power take-off, also situated to the rear of the vehicle frame and hereinafter called the secondary power take-off, which is used to drive the wheels of appliances towed by the tractor.

The invention relates to the clutch unit for the so-called main power take-off.

Generally, said power take-off represents the output shaft of a change-speed gear unit, or transmission, which is driven by an input shaft directly connected to the engine shaft by way of a clutch unit.

The clutch unit can be of the type with its plates in an oil bath, or of another type such as mechanical, without influencing the invention.

Consideration will now be given to the position occupied by the clutch unit in the known art.

In known constructions the clutch unit is spaced from the power take-off by a relatively large distance, and is normally arranged in front of the rear wheel axle.

In those infrequent cases in which the clutch unit is positioned to the rear of the rear wheel axle, it is practically inaccessible from the outside as it lies in front of the change-speed gear unit of the power take-off.

Basically, the clutch unit is positioned in a difficultly accessible region, as tractor drivers and mechanics have found, with the result that inspection, maintenance and repair are lengthy, difficult and uncomfortable.

SUMMARY OF THE INVENTION

The main object of the present invention is to provide a clutch unit arrangement which overcomes the aforesaid problems.

According to the invention the clutch unit is positioned to the side of the power take-off support casing, with the drive hub positioned towards the outside.

By this means, the cover of the clutch unit is able to comprise a seat for sealedly receiving the shaft of the power take-off.

Said arrangement attains all the objects of the invention.

This is because in this position the clutch unit is easily accessible for inspection, maintenance and repair.

The characteristics and constructional merits of the invention will be more apparent from the description given hereinafter with reference to the accompanying drawings:

DETAILED DESCRIPTION OF THE INVENTION

Said figures show a casing 1 to be fixed to a tractor engine and comprising at its rear end (FIG. 1) the clutch unit 2 and that power take-off 3 defined in the introduction as the main power take-off.

Specifically, that part of the casing 1 with which said clutch unit 2 and said power take-off 3 are associated is that positioned to the rear of the tractor rear axle.

Figure 1:
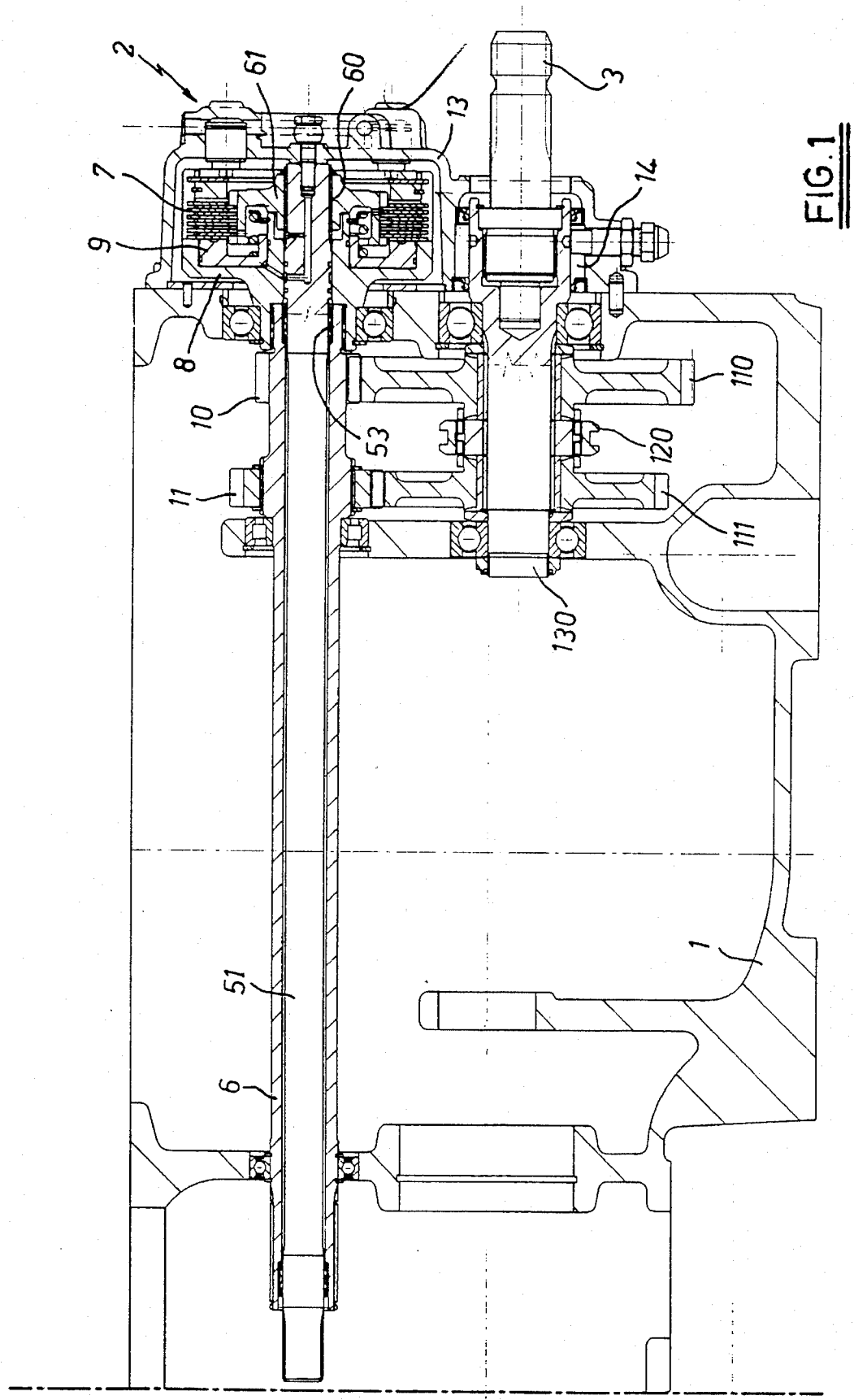
FIG. 1 is an axial section showing the position of the clutch unit according to the invention.

The clutch unit 2 shown in FIG. 1 is of the type with its plates in an oil bath.

Figure 2:
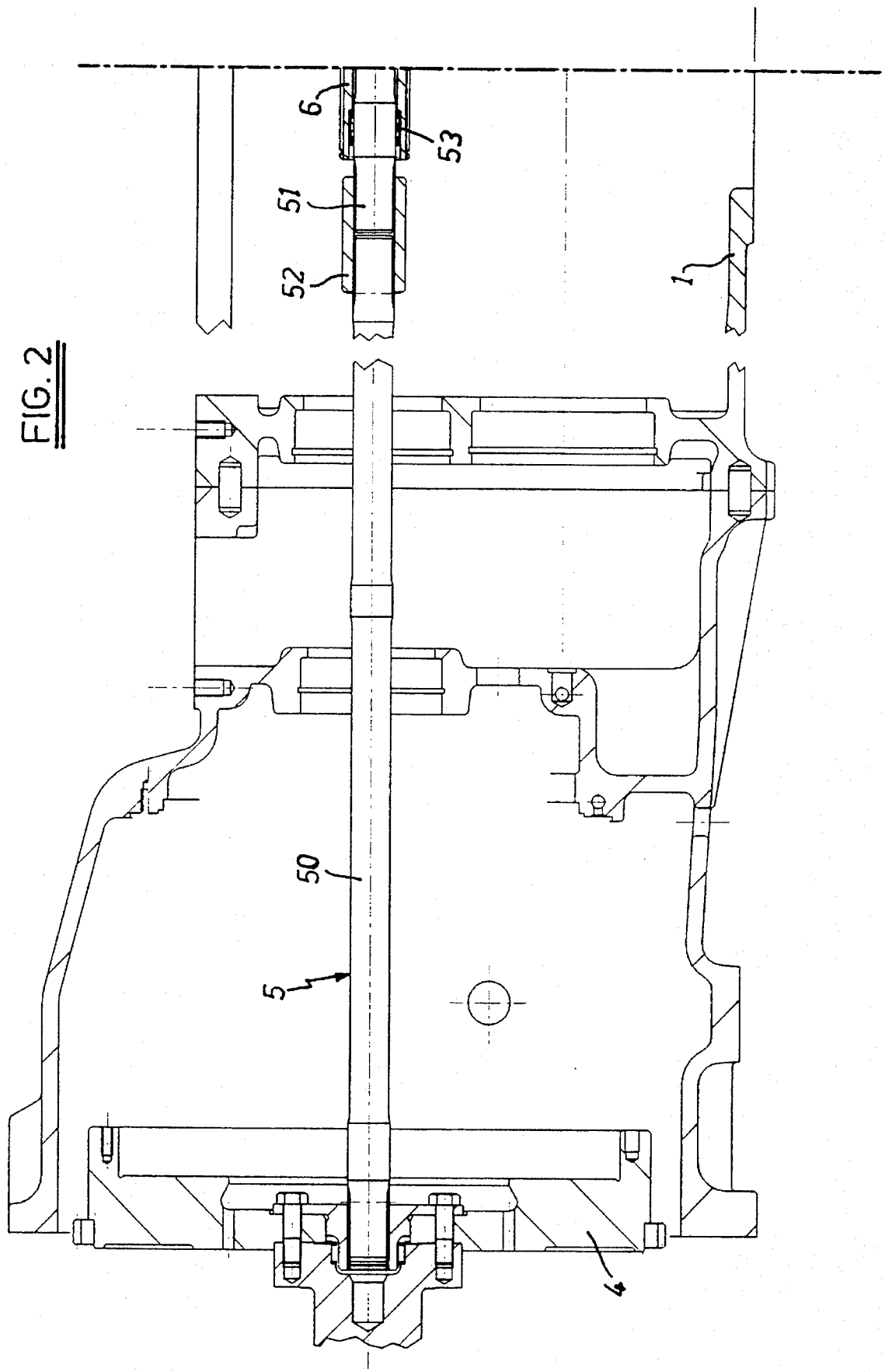
FIG. 2 is a section showing the point from which the clutch unit derives its power.

As can be seen in FIG. 2, the front opposing end of said casing 1 houses the flywheel 4, which is rotated by the tractor engine.

To the center of the flywheel there is keyed a shaft 5 comprising two coaxial portions, the front portion being indicated by 50 and the rear portion by 51.

The facing ends of said two portions 50 and 51 are externally splined and are torsionally constrained by an internally splined sleeve 52.

Beyond said sleeve 52 the portion 51 is inserted, and rotatably mounted via suitable bearings 53, in a hollow shaft 6 rotatably mounted on the casing 1.

The rear end of the portion 51 passes beyond the corresponding end of said hollow shaft 6 and is inserted into the clutch unit 2 where it comprises a splined part 60 which engages in the drive hub 61 of a pack of clutch plates 7.

On the other side of the pack of plates 7 there is a cap 8, between the cap and said pack of plates there being interposed a ring 9 axially slidable within the cap 8.

The ring 9 is elastically urged towards the cap 8, its sliding in the opposite direction being achieved by a pressurized hydraulic fluid as shown in FIG. 1. The cap 8 is mounted rotatable with respect to said casing and said portion 51, and is keyed to the rear end of the hollow shaft 6.

The hollow shaft 6, further comprises two pinions 10, 11 of different pitch circle diameters.

Said pinions 10 and 11 engage respective gearwheels 110 and 111 mounted idly on the keying shaft 130 of the power take-off 3.

The engagement of the one 110 or other 111 of said two gearwheels is controlled by a coupling device 120 positioned between said gearwheels 110, 111 and keyed onto said shaft 130.

Finally, it should be noted that the constituent elements of the clutch unit 2 are contained in a cover 13 fixed at its base to the rear end of the casing 1. Said cover 13 is elongated towards the power take-off 3 and having a hole 14 therein, where it provides a seat for receiving the seal members of the end for the shaft 130 on which the power take-off 3 is keyed.

The merits and advantages of the invention are clearly apparent from the aforegoing and from an examination of the accompanying figures.

I claim:

1. A clutch unit for a main power take-off for use behind the rear wheel axle of an agricultural tractor comprising a casing having forward and rearward portions disposed within said casing a rotatably mounted input shaft having a front end aligned with and connected to an external engine drive shaft at the forward portion of said casing, said input shaft disposed inside of a rotatably mounted hollow coaxial output shaft, a rear end of said input shaft extending beyond a rear end of said output shaft into a clutch assembly operably connecting said input and output shafts at the rearward portion of said casing, said output shaft driving a rotatably mounted main power take-off shaft through a change-speed gear unit.

2. The clutch unit according to claim 1, wherein said clutch assembly is positioned at a rear end of said input and output shafts.

3. The clutch unit according to claim 1, further comprising a removable cover at a rear of said casing for providing maintenance access to said clutch unit.

4. The clutch unit according to claim 3, wherein said removable cover further comprises a hole which receives the power take-off shaft in a sealed manner.

5. A clutch unit for a main power take-off for use behind the rear wheel axle of an agricultural tractor comprising a casing having forward and rearward portions, disposed within said casing a rotatably mounted input shaft having a front end aligned with and connected to an external engine drive shaft at the forward portion of said casing, said input shaft disposed inside of a rotatably mounted hollow coaxial output shaft, a rear end of said input shaft extending beyond a rear end of said output shaft and into a clutch assembly operably connecting said input and output shafts, positioned at a rear end of said, input and output shafts, said output shaft at the rearward portion of said casing driving a rotatably mounted main power take-off shaft through a change-speed gear unit and a removable cover provided at the rearward of said casing for providing maintenance access to said clutch unit.

6. A clutch unit for a main power take-off of an agricultural tractor, which clutch unit is positioned behind a rear wheel axle of said tractor, comprising a casing, disposed within said casing a rotatably mounted input shaft having a front end aligned with and connected to an external engine drive shaft, said input shaft disposed inside of a rotatably mounted hollow coaxial output shaft, said input shaft and said output shaft being operably connected through a clutch assembly positioned at a rear end of said input and output shafts, said output shaft driving a main power take-off shaft through a change-speed gear unit and a removable cover provided at a rear of said casing for providing maintenance access to said clutch unit.

7. A clutch, unit for a main power take-off for use behind the rear wheel axle of an agricultural tractor, comprising:

a casing having forward and rearward portions;

disposed within said casing a rotatably mounted input shaft having a front end aligned with and connected to an external engine drive shaft, said input shaft disposed within a rotatably mounted hollow output shaft coaxial to said input shaft, a rear end of said input shaft extending beyond a rear end of said output shaft and into a clutch assembly at the rearward portion of said casing, said clutch assembly comprising a drive hub which is integrally connected to said input shaft, a plurality of clutch plates in front of said drive hub, and a cap in front of said clutch plates, said cap being integrally connected to the rear end of said output shaft, said output shaft having mounted thereon a plurality of gearwheels in front of said clutch assembly, forming a change-speed gear unit for driving a rotatably mounted main power take-off shaft, said main power take-off shaft mounted parallel to said input and output shafts; and a removable cover at the rearward portion of said casing for providing maintenance access to said clutch unit.

8. An agricultural tractor comprising a clutch unit for main power take-off, positioned behind the rear wheel axle of said tractor, said clutch unit comprising a casing, disposed within said casing a rotatably mounted input shaft having a front end aligned with and connected to an external engine drive shaft, said input shaft disposed inside of a rotatably mounted hollow coaxial output shaft, said input shaft and said output shaft being operably connected through a clutch assembly positioned at a rear end of said input and output shafts, said output shaft driving a rotatably mounted main power take-off shaft through a change-speed gear unit.

9. The agricultural tractor according to claim 8, wherein said clutch unit further comprises a removable cover provided at a rear of said casing for providing maintenance access to said clutch unit.

10. The agricultural tractor according to claim 9, wherein said removable cover further comprises a hole which receives the power take-off shaft in a sealed manner.

* * * * *